(12) United States Patent
Lee

(10) Patent No.: US 8,531,553 B2
(45) Date of Patent: Sep. 10, 2013

(54) DIGITAL PHOTOGRAPHING APPARATUS, METHOD OF CONTROLLING THE SAME AND COMPUTER READABLE MEDIUM HAVING RECORDED THEREON PROGRAM FOR EXECUTING THE METHOD

(75) Inventor: Jae-myung Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 379 days.

(21) Appl. No.: 12/874,359

(22) Filed: Sep. 2, 2010

(65) Prior Publication Data

US 2011/0063476 A1  Mar. 17, 2011

(30) Foreign Application Priority Data

Sep. 14, 2009 (KR) .................. 10-2009-0086669

(51) Int. Cl.
*H04N 5/76* (2006.01)
(52) U.S. Cl.
USPC ............... 348/231.9; 348/231.99; 348/231.7

(58) Field of Classification Search
USPC .................. 348/231.99, 231.7, 231.9
See application file for complete search history.

(56) References Cited

U.S. PATENT DOCUMENTS

| 2003/0030731 | A1* | 2/2003 | Colby | 348/231.3 |
| 2004/0018014 | A1* | 1/2004 | Doi | 396/429 |
| 2004/0174442 | A1* | 9/2004 | Chosa | 348/231.1 |
| 2007/0182745 | A1* | 8/2007 | Park | 345/501 |
| 2009/0262216 | A1* | 10/2009 | Sasaki | 348/231.7 |

* cited by examiner

*Primary Examiner* — Anthony J Daniels
(74) *Attorney, Agent, or Firm* — Drinker Biddle & Reath LLP

(57) ABSTRACT

A method is provided for controlling a digital photographing apparatus in which a captured image is stored in a non-volatile memory card, the method including: determining whether the non-volatile memory card is available; and if the non-volatile memory card is not available, transmitting the captured image that is temporarily stored in a volatile memory in response to a request to transmit the captured image. An associated apparatus and storage media for implementing the method are also provided.

18 Claims, 6 Drawing Sheets

DIGITAL PHOTOGRAPHING APPARATUS, METHOD OF CONTROLLING THE SAME AND COMPUTER READABLE MEDIUM HAVING RECORDED THEREON PROGRAM FOR EXECUTING THE METHOD

CROSS-REFERENCE TO RELATED PATENT APPLICATION

This application claims the benefit of Korean Patent Application No. 10-2009-0086669, filed on Sep. 14, 2009, in the Korean Intellectual Property Office, the disclosure of which is incorporated herein in its entirety by reference.

BACKGROUND

The present invention relates to a digital photographing apparatus, a method of controlling the same, and a computer readable medium having recorded thereon a program for executing the method.

Generally, digital photographing apparatuses convert an optical signal that is provided to an optical unit such as a lens or an iris diaphragm into an electrical signal by using an image pickup unit, focus on a particular subject among subjects to be photographed, and obtain image data from light that is incident on the image pickup unit, thereby photographing a subject. The obtained data is stored in a storage medium by performing a series of processes. Digital photographing apparatuses may use a removable non-volatile memory, such as a flash memory card or a secure digital (SD) card, to store a captured image.

SUMMARY

Various embodiments of the invention provide a digital photographing apparatus in which, even when a non-volatile memory card is not available, a user can transmit a captured image to an external device, a method of controlling the same, and a computer readable medium having recorded thereon a program for executing the method.

According to an embodiment of the invention, there is provided a method of controlling a digital photographing apparatus comprising a non-volatile memory card interface, the method including: determining whether the non-volatile memory card is available; and if the non-volatile memory card is not available, transmitting the captured image that is temporarily stored in a volatile memory in response to a request to transmit the captured image.

The captured image may be a last image captured, an address of the volatile memory in which the captured image is stored may be a fixed address, and the transmitting of the captured image that is temporarily stored in the volatile memory includes: accessing the captured image stored in the volatile memory by using the fixed address of the volatile memory in which the captured image is stored; and transmitting the captured image.

The method may further include providing a user interface through which a user inputs the request to transmit the captured image. The providing of the user interface may include providing the user interface if a communication function of the digital photographing apparatus is available.

The method may further include, if the non-volatile memory card is available, accessing the captured image stored in the non-volatile memory card and transmitting the captured image in response to the request to transmit the captured image.

The non-volatile memory card may be a removable memory card, and a case that the non-volatile memory card is not available may result when the non-volatile memory card has been removed from the digital photographing apparatus, or result when an available storage space in the non-volatile memory card is insufficient. The volatile memory may be random access memory (RAM).

According to another aspect of the present invention, there is provided a digital photographing apparatus including: a photographing unit for generating a captured image from an optical signal; a volatile memory for temporarily storing the captured image; a memory card detector for determining whether a removable non-volatile memory card is available; and a communication unit for transmitting, if the non-volatile memory card is not available, the captured image stored in the volatile memory in response to a request to transmit the captured image.

The captured image may be a last image captured, an address of the volatile memory in which the captured image is stored may be a fixed address, and the communication unit may access the captured image stored in the volatile memory by using the fixed address of the volatile memory in which the captured image is stored, and may transmit the captured image.

The digital photographing apparatus may further include a user interface provision unit for providing a user interface through which a user inputs the request to transmit the captured image. The user interface provision unit may provide the user interface when the communication unit is able to communicate with an external device.

If the non-volatile memory card is available, the communication unit may access the captured image stored in the non-volatile memory card and may transmit the captured image in response to the request to transmit the captured image.

According to another aspect of the present invention, there is provided a non-transitory computer readable medium having a computer readable program code recorded thereon, said computer readable program code adapted to be executed to implement a method for controlling a digital photographing apparatus in which a captured image is stored in a non-volatile memory card, wherein the program code includes: a code portion for determining whether the non-volatile memory card is available; and a code portion, if the non-volatile memory card is not available, for transmitting the captured image that is temporarily stored in a volatile memory in response to a request to transmit the captured image.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION

Various embodiments of the invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those of ordinary in the art.

Figure 1:
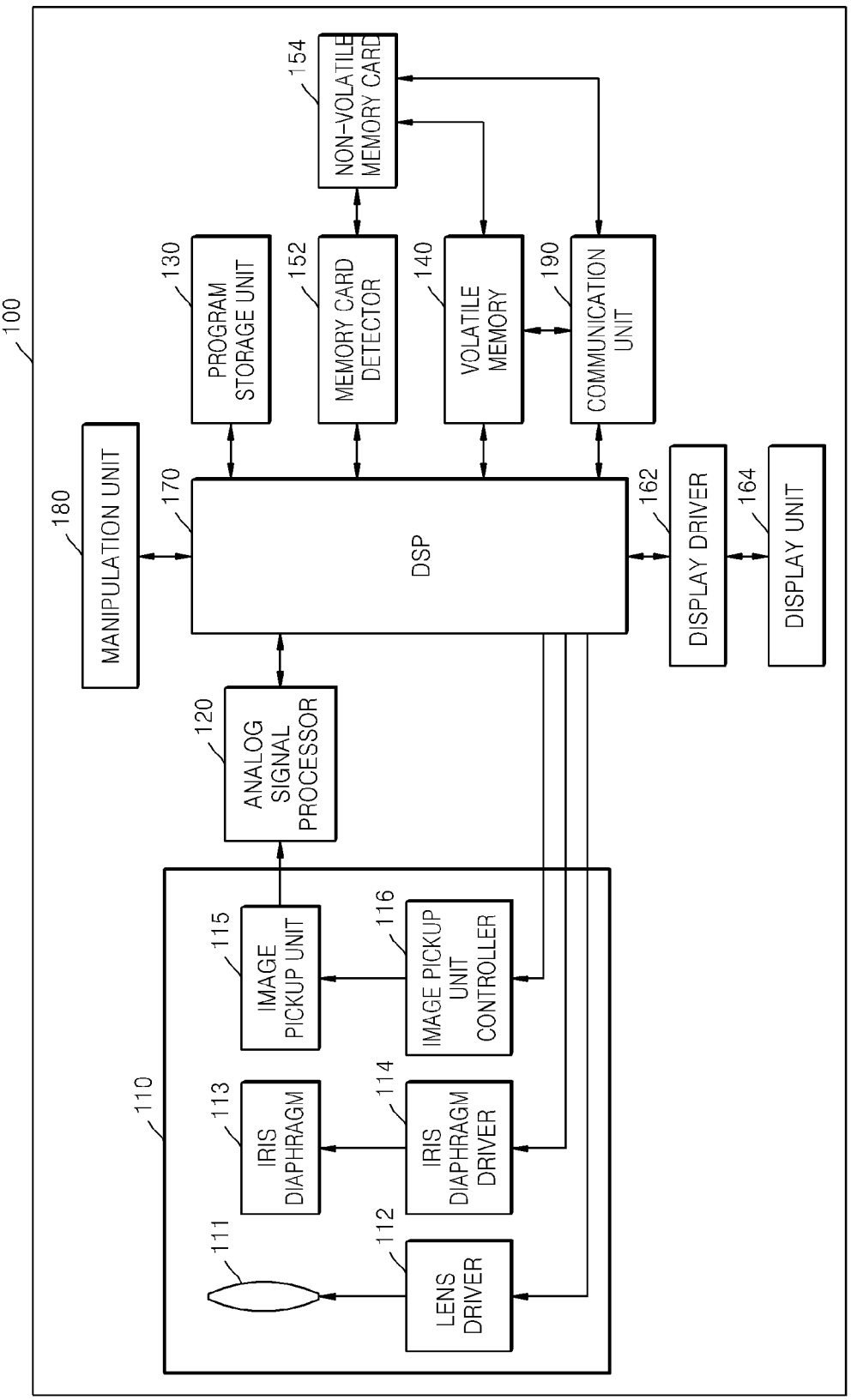
FIG. 1 is a block diagram of a digital photographing apparatus according to an embodiment of the present invention.
Figure 2:
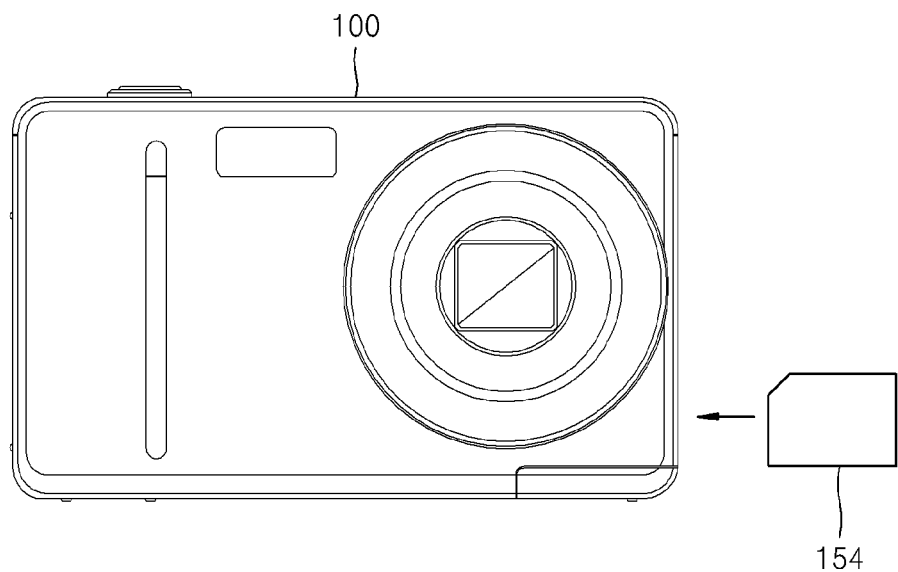
FIG. 2 is a pictorial diagram showing a front view of the digital photographing apparatus of FIG. 1 and a non-volatile memory card that can be attached or removed to or from the digital photographing apparatus of FIG. 1.

FIG. 1 is a block diagram of a digital photographing apparatus 100 according to an embodiment of the present invention, and FIG. 2 illustrates the digital photographing apparatus 100 of FIG. 1 and a non-volatile memory card 154 that can be attached or removed to or from the digital photographing apparatus 100 of FIG. 1. Referring to FIG. 1, the digital photographing apparatus 100 of FIG. 1 includes a photographing unit 110, an analog signal processor 120, a program storage unit 130, a volatile memory 140, a memory card detector 152, the non-volatile memory card 154, a display driver 162, a display unit 164, a digital signal processor (DSP) 170, a manipulation unit 180, and a communication unit 190.

The photographing unit 110 generates a captured image from an optical signal. The photographing unit 110 may include a lens 111, a lens driver 112, an iris diaphragm 113, an iris diaphragm driver 114, an image pickup unit 115, and an image pickup unit controller 116.

The lens 111 receives the optical signal. The lens 111 includes a zoom lens that controls a viewing angle to be decreased or increased according to a focal length, and a focus lens that focuses on a subject. Each of the zoom lens and the focus lens may include one lens or a plurality of lenses.

A user may control the degree of opening and closing of the iris diaphragm 113 in order to adjust the quantity of incident light.

The lens driver 112 and the iris diaphragm driver 114 receive a control signal from the DSP 170 to drive the lens 111 and the iris diaphragm 113, respectively. The lens driver 112 adjusts the position of the lens 111 to adjust the focal length so that the user can perform operations of automatic focusing (AF), zooming, and focus changing. The iris diaphragm driver 114 controls the degree of opening and closing of the iris diaphragm 113, for example, an f-number, so that the user can perform operations of AF, automatic exposure correction, focus changing, and controlling a depth of field.

When an optical signal that is passing through the photographing unit 110 reaches a light-receiving surface of the image pickup unit 115, an image of the subject is formed thereon. The image pickup unit 115 may be a charge-coupled device (CCD) or a complementary metal-oxide semiconductor image sensor (CIS) that converts an optical signal into an electrical signal. The sensitivity of the image pickup unit 115 may be adjusted by the image pickup unit controller 116. The image pickup unit controller 116 may control the image pickup unit 115 according to a control signal that is automatically generated due to a real-time input image signal, or according to a control signal that is manually input by a user's manipulation.

The exposure time of the image pickup unit 115 is adjustable with a shutter (not shown). Examples of the shutter include a mechanical shutter that controls incidence of light by mechanically moving a shutter and an electronic shutter that controls exposure by supplying an electrical control signal to the image pickup unit 116.

The analog signal processor 120 performs noise reduction, gain control, waveform shaping, and analog-digital conversion on an analog signal supplied from the image pickup unit 115.

A control signal is input thorough the manipulation unit 180 by the user. The manipulation unit 180 may include a shutter-release button for inputting a shutter-release signal used to perform a photographing operation by exposing the image pickup unit 115 for a predetermined amount of time, a power button for inputting a control signal used to control the turn-on or -off of the digital photographing apparatus 100, a wide-angle-zoom button, a telephotographic-zoom button for enlarging or reducing a viewing angle according to a user's input, and various functional buttons for selecting at least one mode/function from the group consisting of a text input mode, a photographing mode, a reproduction mode, a white balance setting function, and an exposure setting function. The manipulation unit 180 may have various types of buttons, or may include a keyboard, a touch pad, a touch screen, a remote controller, or the like.

The program storage unit 130 stores a program of an operating system or an application system for driving the digital photographing apparatus 100. The digital photographing apparatus 100 reads computer code stored in the program storage unit 130, executes it, and then operates. The program storage unit 130 is a non-volatile memory and may be a read-only memory (ROM).

The volatile memory 140 temporarily stores data that is needed during calculation or resultant data. The captured image is temporarily stored in the volatile memory 140, and the temporarily-stored captured image is transmitted to the non-volatile memory card 154 and is stored therein. The volatile memory 140 may store only a limited number of captured images that have been captured recently. If the digital photographing apparatus 100 is turned off, all data stored in the volatile memory 140 is deleted. The volatile memory 140 includes space that is designated for storing the captured image. A position in which the captured images that have been captured recently is fixed, and thus, an address in which the recently-photographed captured images are to be stored may be constant.

The temporarily stored resultant data is stored in the non-volatile memory card 154. The non-volatile memory card 154 may be a removable memory card, as illustrated in FIG. 2, and may be a flash memory card or a secure digital (SD) card. In order to attach or remove the non-volatile memory card 154 to or from the digital photographing apparatus 100, a slot through which the non-volatile memory card 154 is installed in a housing of the digital photographing apparatus 100 is formed.

The memory card detector 152 detects whether the non-volatile memory card 154 is available. When the non-volatile memory card 154 is "available", the non-volatile memory card 154 is installed in the digital photographing apparatus 100, and there is an available storage space in the non-volatile memory card 154. When the non-volatile memory card 154 is "not available", the non-volatile memory card 154 has been removed from the digital photographing apparatus 100, or there is an insufficient available storage space in the non-volatile memory card 154. The memory card detector 152 may detect whether the non-volatile memory card 154 is available, by using a control signal that is generated when the non-volatile memory card 154 is removed from or installed in the digital photographing apparatus 100. Also, the memory card detector 152 detects the available storage space of the non-volatile memory card 154. When the available storage space is smaller than the size of a captured image, it may be determined that the non-volatile memory card 154 is not available.

Furthermore, the display unit 164 displays an operating state of the digital photographing apparatus 100 or information about an image captured by the digital photographing apparatus 100. The display unit 164 may provide audio-visual information to the user. In order to provide the visual information, the display unit 164 may be a liquid crystal display (LCD), an organic light-emitting display (OLED) device, an electrophoretic display (EPD), or similar unit. The display driver 162 supplies a driving signal to the display unit 164.

The DSP 170 processes an input image signal, and controls the elements of the digital photographing apparatus 100 according to the input image signal or an external input signal. The DSP 170 performs image signal processing for improving the quality of an image, such as noise reduction in input image data, Gamma correction, color filter array interpolation, color matrix correction, color correction, and color enhancement. Also, the DSP 170 generates an image file by compressing image data that is generated during the image signal processing for improving the quality of an image, or restores the image data from the image file. The image data is compressed in a reversible or a non-reversible format. As an example of an appropriate format for compressing the image data, the image data may be compressed in a joint photographic experts group (JPEG) format such as JPEG 2000. The compressed data may be stored in the data storage unit 150.

The DSP 170 also performs unclearness processing, color processing, blur processing, edge emphasis processing, image interpretation processing, image recognition processing, image effect processing, etc, wherein the image recognition processing may include face recognition or scene recognition processing.

The DSP 170 also performs display image signal processing so as to display the operating state of the digital photographing apparatus 100 or the information about an image captured by the digital photographing apparatus 100 on the display unit 164. For example, the DSP 170 performs brightness level adjustment, color correction, contrast adjustment, contour emphasis adjustment, screen division processing, and character image generation and synthesis processing. The DSP 170 is connected to an external monitor and performs predetermined image signal processing so that a predetermined image may be displayed on the external monitor, and transmits the processed image data to the external monitor so as to display the predetermined image on the external monitor.

Also, the DSP 170 executes the program stored in the program storage unit 130, or includes an additional module to generate a control signal for use in automatic focusing, zooming, focus changing, and automatic exposure correction, to provide the control signal to the lens driver 112, the iris diaphragm driver 114, and the image pickup unit controller 116, and to control operations of the elements of the digital photographing apparatus 100 such as the shutter, a flash (not illustrated), etc.

The communication unit 190 communicates with an external device, and transmits data stored in the digital photographing apparatus 100 to the external device. The communication unit 190 transmits the data stored in the non-volatile memory card 154 and the data stored in the volatile memory 140. The communication unit 190 may be configured to perform wired or wireless communication.

According to another embodiment of the present invention, when the memory card detector 152 determines that the non-volatile memory card 154 is not available and a request to transmit the captured image is input to the DSP 170, the DSP 170 may generate captured image address information that indicates an address of the volatile memory 140 in which the captured image is stored, and may provide the captured image address information to the communication unit 190. The communication unit 190 may access the data of the captured image by using the captured image address information and may transmit the captured image to the external device. The request to transmit the captured image may be a user input that is input through the manipulation unit 180.

According to another embodiment of the present invention, a latest captured image is stored in a fixed position of the volatile memory 140, and when the communication unit 190 determines that the non-volatile memory card 154 is not available and a request to transmit the captured image is input to the communication unit 190, the communication unit 190 may access the captured image stored in the volatile memory 140 by using address information of the fixed position and may transmit the captured image to the external device.

Since the non-volatile memory card 154 can be attached or removed to or from the digital photographing apparatus 100, when the non-volatile memory card 154 is removed from the digital photographing apparatus 100, even though the user photographs by using the digital photographing apparatus 100, the captured image may not be stored in the non-volatile memory card 154. Also, even though the non-volatile memory card 154 is installed in the digital photographing apparatus 100, when there is an insufficient available storage space in the non-volatile memory card 154, the captured image may not be stored in the non-volatile memory card 154. However, the captured image is stored in the volatile memory 140 for temporarily storing the data processed by the DSP 170 regardless of the provision of the non-volatile memory card 154. According to various embodiments of the invention, when the non-volatile memory card 154 is not available, the captured image that is temporarily stored in the volatile memory 140 may be transmitted to the external device. Also, a path on which the captured image is to be transmitted is formed between the volatile memory 140 and the communication unit 190 so that the communication unit 190 may access the captured image stored in the volatile memory 140 and the captured image may be transmitted to the external device.

Figure 3:
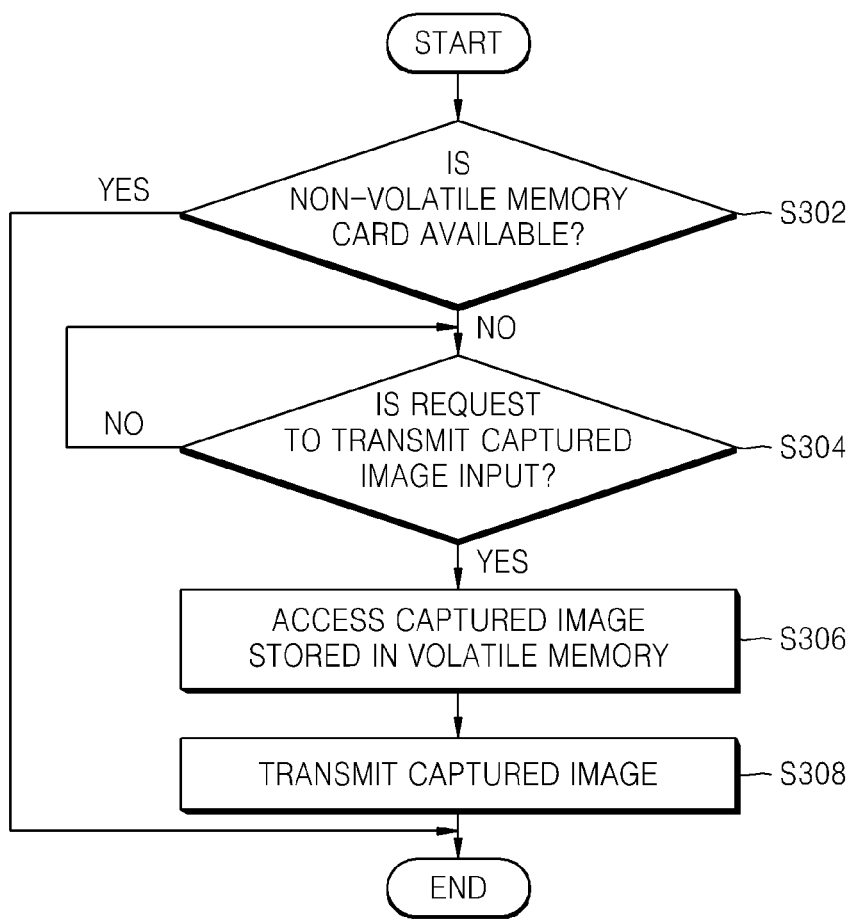
FIG. 3 is a flowchart illustrating a method of controlling the digital photographing apparatus shown in FIG. 1, according to an embodiment of the present invention.

FIG. 3 is a flowchart illustrating a method of controlling the digital photographing apparatus 100 shown in FIG. 1, according to an embodiment of the present invention. Referring to FIG. 3, the method of controlling the digital photographing apparatus 100 according to the present embodiment includes determining whether the non-volatile memory 154 is available (Operation S302). If the non-volatile memory card 154 is available, this means that the non-volatile memory 154 is installed in the digital photographing apparatus 100, and there is an available storage space in the non-volatile memory card 154. Otherwise if the non-volatile memory card 154 is not available, this means that the non-volatile memory card 154 has been removed from the digital photographing apparatus 100, or there is an insufficient available storage space in the non-volatile memory card 154.

Whether the non-volatile memory card 154 is available may be determined based on a control signal that is generated when the non-volatile memory card 154 has been removed from or installed in the digital photographing apparatus 100.

Also, the available storage space of the non-volatile memory card 154 is detected, and when the available storage space of the non-volatile memory card 154 is smaller than the size of a captured image, it may be determined that the non-volatile memory card 154 is not available.

If the non-volatile memory card 154 is not available, a request to transmit the captured image is provided (Operation S304), and the captured image that is stored in the volatile memory 140 is accessed (Operation S306). The request to transmit the captured image may be a user input that is input through the manipulation unit 180.

Next, the captured image stored in the volatile memory 140 is transmitted to an external device (Operation S308). The external device may be an electronic device or a network server that communicates with the digital photographing apparatus 100.

Figure 4:
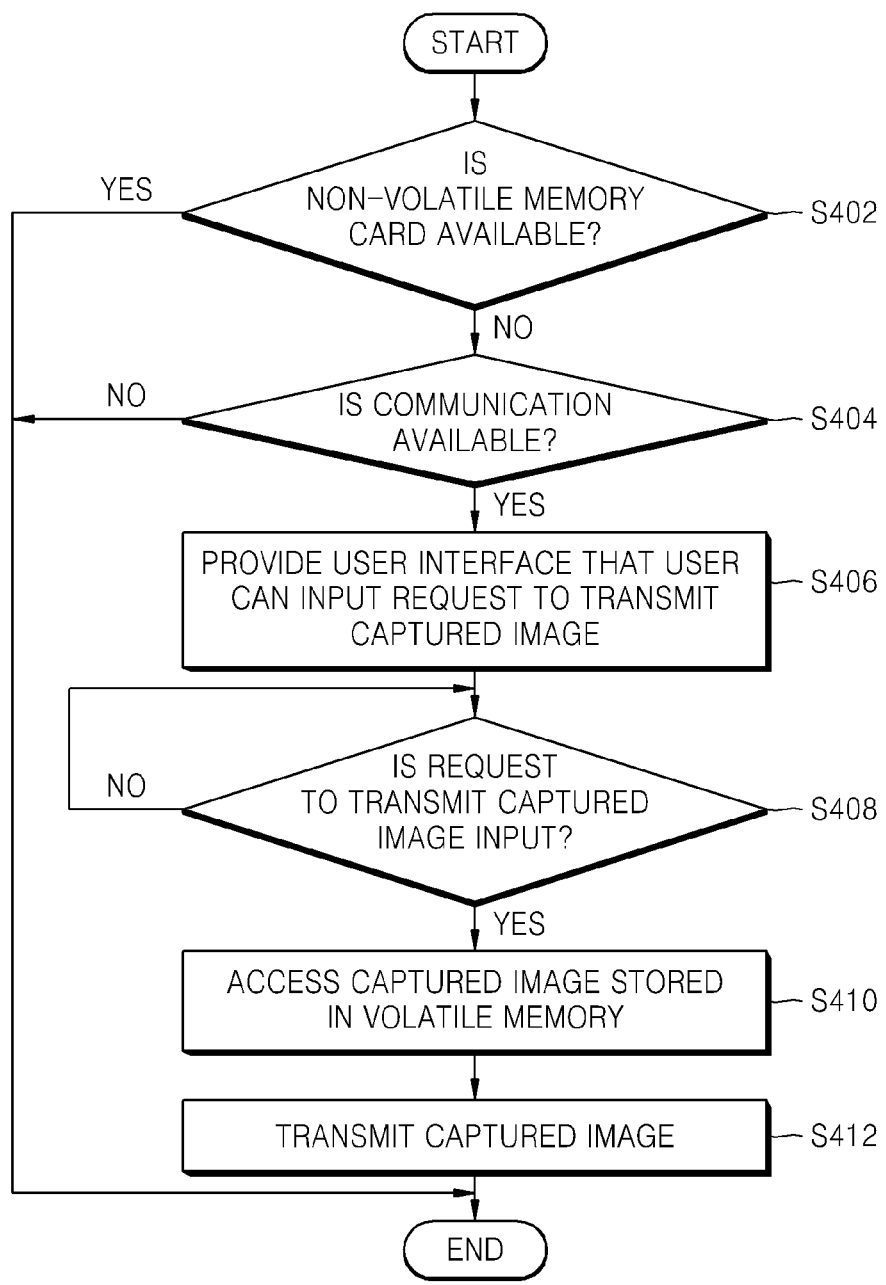
FIG. 4 is a flowchart illustrating a method of controlling the digital photographing apparatus shown in FIG. 1, according to another embodiment of the present invention.

FIG. 4 is a flowchart illustrating a method of controlling the digital photographing apparatus 100 shown in FIG. 1, according to another embodiment of the invention. Referring to FIG. 4, the method of controlling the digital photographing apparatus 100 according to the present embodiment includes, if the non-volatile memory card 154 is not available (Operation S402) and a communication function of the digital photographing apparatus 100 is available (Operation S404), providing a user interface through which a user inputs a request to transmit a captured image (Operation S406). The request to transmit the captured image may include information that indicates a location to which the captured image is to be transmitted, and the information may be information that is used to designate a particular external device, an email address or a server address. The location, and possibly the type of protocol, may be entered at the time of the request to transmit the captured image, or can be set up in a preferences area for the device. One or more locations/protocols may be provided in the set up that the user can select between at the time of transmission.

The case that the communication function of the digital photographing apparatus 100 is "available" may mean that (or result when) the digital photographing apparatus 100 is connected to the external device in a wired or wireless manner, or may mean that the digital photographing apparatus 100 is accessible through the Internet.

If the request to transmit the captured image is input (Operation S408), the captured image stored in the volatile memory 140 is accessed (Operation S410). According to the present embodiment, a captured image that has been captured recently may be stored in a fixed position of the volatile memory 140, and the captured image may be accessed by using address information that indicates the fixed position.

Next, the captured image stored in the volatile memory 140 is transmitted according to the request to transmit the captured image (Operation S412).

Figure 5:
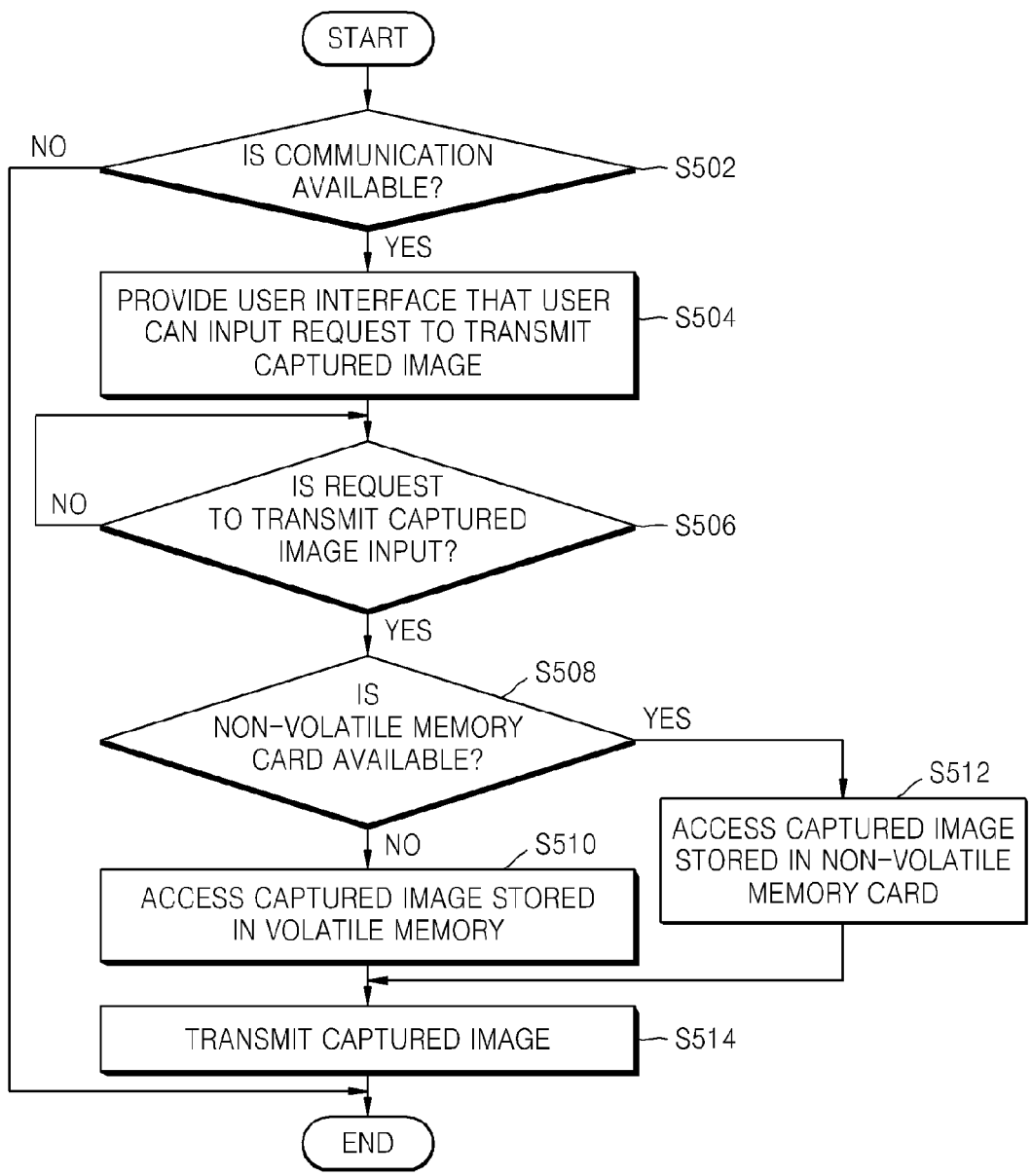
FIG. 5 is a flowchart illustrating a method of controlling the digital photographing apparatus shown in FIG. 1, according to another embodiment of the present invention.

FIG. 5 is a flowchart illustrating a method of controlling the digital photographing apparatus 100 shown in FIG. 1, according to still another embodiment of the present invention. Referring to FIG. 5, the method of controlling the digital photographing apparatus 100 according to the present embodiment includes, if the non-volatile memory card 154 is available, transmitting a captured image stored in the non-volatile memory card 154, and if the non-volatile memory card 154 is not available, otherwise, transmitting the captured image stored in the volatile memory 140.

The method of controlling the digital photographing apparatus 100 according to the present embodiment includes, first, determining whether the communication function of the digital photographing apparatus 100 is available (Operation S502). If the communication function of the digital photographing apparatus 100 is available (Operation S502), a user interface through which a user inputs a request to transmit a captured image is provided (Operation S504). If the request to transmit the captured image is input (Operation S506), the method further includes determining whether the non-volatile memory card 154 is available (Operation S508).

If the non-volatile memory card 154 is not available (Operation S508), the captured image stored in the volatile memory 140 is accessed (Operation S510) and is transmitted according to the request to transmit the captured image (Operation S514).

If the non-volatile memory card 154 is available (Operation S508), the captured image stored in the non-volatile memory card 154 is accessed (Operation S512) and is transmitted according to the request to transmit the captured image (Operation S514).

Figure 6:
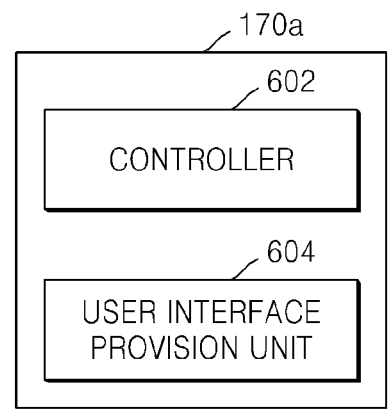
FIG. 6 is a block diagram of a structure of a digital signal processor (DSP) of the digital photographing apparatus of FIG. 1, according to another embodiment of the present invention.

FIG. 6 is a block diagram of a structure of a DSP 170*a* of the digital photographing apparatus 100 of FIG. 1, according to another embodiment of the present invention. Referring to FIG. 6, the DSP 170*a* according to the present embodiment may include a controller 602 and a user interface provision unit 604.

The controller 602 controls operations of the digital photographing apparatus 100. Also, the controller 602 may supply a control signal to the lens driver 112, the iris diaphragm driver 114, the image pickup unit controller 116, the display driver 162, the manipulation unit 180, and the communication unit 190.

The user interface provision unit 604 may provide a user interface through which a user inputs a request to transmit a captured image when the non-volatile memory card 154 is not available and the communication unit 190 is able to communication with an external device. The user interface may be implemented using the manipulation unit 180, computer code for the user interface stored in the program storage unit 130, the DSP 170 that executes the computer code, and the display driver 162 and the display unit 164 that operates to display the user interface.

According to still another embodiment of the present invention, the user interface provision unit 604 may provide the user interface through which the user inputs the request to transmit the captured image when the communication unit 190 is able to communicate with an external device regardless of availability of the non-volatile memory card 154, and any related information, such as location, protocol, parameters, etc. According to the present embodiment, when the request to transmit the captured image is input and the non-volatile memory card 154 is not available, the communication unit 190 accesses the captured image stored in the volatile memory 140 and transmits the captured image. Otherwise, when the request to transmit the captured image is input and the non-volatile memory card 154 is available, the communication unit 190 may access the captured image stored in the non-volatile memory card 154 and may transmit the captured image.

Any embodiment of the invention can also be embodied as computer readable code on a computer readable medium. The computer readable medium is any data storage device that can store data which can be thereafter read by a computer system.

When the computer readable code is read from the computer readable medium and is executed by the DSP 170, the computer readable code may perform the operations of the methods of controlling the digital photographing apparatus 100 illustrated in FIGS. 3, 4, and 5. The computer readable code may be implemented in various programming languages. Also, functional programs, code, and code segments for accomplishing the present invention can be easily construed by programmers skilled in the art to which the present invention pertains.

Examples of the computer readable medium include read-only memory (ROM), random-access memory (RAM), CD-ROMs, magnetic tapes, floppy disks, and optical data storage devices. The computer readable medium can also be distributed over network coupled computer systems so that the computer readable code is stored and executed in a distributed fashion.

As described above, in the digital photographing apparatus, the method of controlling the same and the computer readable medium having recorded thereon a program for executing the method according to the present invention, even when a non-volatile memory card is not available, a user can transmit a captured image to an external device. Thus, even though the non-volatile memory card is not available, the user can keep the captured image in the external device.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the present invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the present invention.

What is claimed is:

1. A method of controlling a digital photographing apparatus comprising a non-volatile memory card interface, the method comprising: determining whether the non-volatile memory card is available; and if the non-volatile memory card is not available, transmitting the captured image that is temporarily stored in a volatile memory to an external device in response to a request to transmit the captured image, wherein: the captured image is a last image captured, an address of the volatile memory in which the captured image is stored is a fixed address, and the transmitting of the captured image that is temporarily stored in the volatile memory comprises: accessing the captured image stored in the volatile memory by using the fixed address of the volatile memory in which the captured image is stored; and transmitting the captured image to the external device.

2. The method of claim 1, further comprising providing a user interface through which a user inputs the request to transmit the captured image.

3. The method of claim 2, wherein the providing of the user interface comprises providing the user interface if a communication function of the digital photographing apparatus is available.

4. The method of claim 1, further comprising, if the non-volatile memory card is available:
   accessing the captured image stored in the non-volatile memory card; and
   transmitting the captured image to the external device in response to the request to transmit the captured image.

5. The method of claim 1, wherein the non-volatile memory card is a removable memory card, and a case that the non-volatile memory card is "not available" results when the non-volatile memory card has been removed from the digital photographing apparatus, or results when an available storage space in the non-volatile memory card is insufficient.

6. The method of claim 1, wherein the volatile memory is random access memory (RAM).

7. A digital photographing apparatus comprising: a photographing unit for generating a captured image from an optical signal; a volatile memory for temporarily storing the captured image; a memory card detector for determining whether a removable non-volatile memory card is available; and a communication unit for transmitting, if the non-volatile memory card is not available, the captured image stored in the volatile memory to an external device in response to a request to transmit the captured image, wherein: the captured image is a last image captured, an address of the volatile memory in which the captured image is stored is a fixed address, and the communication unit accesses the captured image stored in the volatile memory by using the fixed address of the volatile memory in which the captured image is stored, and transmits the captured image to the external device.

8. The digital photographing apparatus of claim 7, further comprising a user interface provision unit for providing a user interface through which a user inputs the request to transmit the captured image.

9. The digital photographing apparatus of claim 8, wherein the user interface provision unit provides the user interface when the communication unit is able to communicate with an external device.

10. The digital photographing apparatus of claim 7, wherein, if the non-volatile memory card is available:
the communication unit accesses the captured image stored in the non-volatile memory card; and
transmits the captured image to the external device in response to the request to transmit the captured image.

11. The digital photographing apparatus of claim 7, wherein a case that the non-volatile memory card is not "available" results when the non-volatile memory card has been removed from the digital photographing apparatus, or results when an available storage space in the non-volatile memory card is insufficient.

12. The digital photographing apparatus of claim 7, wherein the volatile memory is random access memory (RAM).

13. A non-transitory computer readable medium having a computer readable program code recorded thereon, said computer readable program code adapted to be executed to implement a method for controlling a digital photographing apparatus in which a captured image is stored in a non-volatile memory card, wherein the program code comprises: a code portion for determining whether the non-volatile memory card is available; and a code portion for, if the non-volatile memory card is not available, transmitting the captured image that is temporarily stored in a volatile memory to an external device in response to a request to transmit the captured image, wherein: the captured image is a last image captured, an address of the volatile memory in which the captured image is stored is a fixed address, and the code portion for transmitting of the captured image that is temporarily stored in the volatile memory comprises: a code portion for accessing the captured image stored in the volatile memory by using the fixed address of the volatile memory in which the captured image is stored; and a code portion for transmitting the captured image to the external device.

14. The medium of claim 13, further comprising a code portion for providing a user interface through which a user inputs the request to transmit the captured image.

15. The medium of claim 14, wherein the code portion for providing of the user interface provides the user interface when a communication function of the digital photographing apparatus is available.

16. The medium of claim 13, further comprising, when the non-volatile memory card is available:
a code portion for accessing the captured image stored in the non-volatile memory card; and
for transmitting the captured image to the external device in response to the request to transmit the captured image.

17. The medium of claim 13, wherein:
the non-volatile memory card is a removable memory card, and
a case that the non-volatile memory card is not available results when the non-volatile memory card has been removed from the digital photographing apparatus, or results when an available storage space in the non-volatile memory card is insufficient.

18. The medium of claim 13, wherein the volatile memory is random access memory (RAM).

* * * * *